United States Patent
Braun et al.

(10) Patent No.: US 11,292,291 B2
(45) Date of Patent: Apr. 5, 2022

(54) METHOD FOR THE PRODUCTION OF GROUNDED PANELS AND PANEL

(71) Applicant: FLOORING TECHNOLOGIES LTD., Kalkara (MT)

(72) Inventors: Roger Braun, Willisau (CH); Norbert Kalwa, Horn-Bad Meinberg (DE)

(73) Assignee: FLOORING TECHNOLOGIES LTD, Kalkara (MT)

( * ) Notice: Subject to any disclaimer, the term of this patent is extended or adjusted under 35 U.S.C. 154(b) by 894 days.

(21) Appl. No.: 15/656,583

(22) Filed: Jul. 21, 2017

(65) Prior Publication Data

US 2017/0334237 A1 Nov. 23, 2017

Related U.S. Application Data

(62) Division of application No. 13/163,112, filed on Jun. 17, 2011, now abandoned.

(30) Foreign Application Priority Data

Jun. 30, 2010 (EP) .................................. 10006779

(51) Int. Cl.
    *B32B 21/08* (2006.01)
    *B32B 27/10* (2006.01)
    (Continued)

(52) U.S. Cl.
    CPC ................ *B44C 5/043* (2013.01); *B05D 3/12* (2013.01); *B05D 7/06* (2013.01); *B32B 3/06* (2013.01); *B32B 3/30* (2013.01); *B32B 21/08* (2013.01); *B32B 27/10* (2013.01); *B05D 2252/10* (2013.01); *B32B 2260/028* (2013.01);
    (Continued)

(58) Field of Classification Search
    CPC .............. B44C 5/043; B32B 3/06; B32B 3/30
    See application file for complete search history.

(56) References Cited

U.S. PATENT DOCUMENTS

3,646,715 A 3/1972 Pope
4,543,765 A 10/1985 Barrett
(Continued)

FOREIGN PATENT DOCUMENTS

DE 102004009160 9/2005
DE 102008008240 8/2009
(Continued)

*Primary Examiner* — Tong Guo
(74) *Attorney, Agent, or Firm* — Andrew M. Calderon; Roberts Calderon Safran & Cole, P.C.

(57) ABSTRACT

A method for the production of grounded panels and to a panel having a core made from a wood material board. The method includes provision of a wood material board, application of a grounding in the form of a synthetic resin layer to at least one topside of the wood material board, application of a coating to an underside, lying opposite the topside of the wood material board, of the wood material board, pressing of the layer build-up consisting of the wood material board, grounding and coating under the influence of pressure and, if appropriate, temperature, division of the grounded and coated wood material board into individual panels, cutting machining of side faces of the panels for the incorporation of connection and locking means, and transport-safe packaging of the grounded panels.

17 Claims, 3 Drawing Sheets

(51) Int. Cl.
*B44C 5/04* (2006.01)
*B05D 3/12* (2006.01)
*B05D 7/06* (2006.01)
*B32B 3/06* (2006.01)
*B32B 3/30* (2006.01)
*E04F 13/08* (2006.01)
*E04F 15/02* (2006.01)

(52) U.S. Cl.
CPC ... *B32B 2260/046* (2013.01); *B32B 2307/402* (2013.01); *B32B 2307/406* (2013.01); *B32B 2307/554* (2013.01); *B32B 2607/00* (2013.01); *E04F 13/08* (2013.01); *E04F 15/02* (2013.01); *Y10T 156/1039* (2015.01); *Y10T 156/1052* (2015.01)

(56) References Cited

U.S. PATENT DOCUMENTS

| | | |
|---|---|---|
| 4,670,089 A | 6/1987 | Hanson |
| 5,804,019 A | 9/1998 | Sweet et al. |
| 2001/0021734 A1* | 9/2001 | Shaknovich ............. C08K 5/18 524/86 |
| 2002/0114924 A1* | 8/2002 | Albert ...................... B44C 1/10 428/141 |
| 2002/0132050 A1 | 9/2002 | Frame |
| 2004/0086676 A1 | 5/2004 | Peng |
| 2004/0253424 A1 | 12/2004 | Huusken et al. |
| 2005/0000661 A1 | 1/2005 | Cable |
| 2006/0035056 A1 | 2/2006 | Fuzzell |
| 2006/0130421 A1* | 6/2006 | Nollet ..................... B44B 5/026 52/582.1 |
| 2007/0125021 A1 | 6/2007 | Thiers et al. |
| 2011/0200750 A1* | 8/2011 | Meersseman ............ B41M 1/38 427/256 |

FOREIGN PATENT DOCUMENTS

| | | |
|---|---|---|
| EP | 1512468 | 3/2005 |
| EP | 1859912 | 11/2007 |
| EP | 1454763 B1 | 8/2009 |
| WO | 03089736 | 10/2003 |
| WO | 2010055429 | 5/2010 |
| WO | WO2010055429 * | 5/2010 |

* cited by examiner

METHOD FOR THE PRODUCTION OF GROUNDED PANELS AND PANEL

CROSS REFERENCE TO RELATED APPLICATIONS

The present application claims priority under 35 U.S.C. § 119 of Patent Application No. EP 10006779.2, filed on Jun. 30, 2010, and is a divisional application of U.S. patent application Ser. No. 13/163,112 and which are expressly incorporated by reference herein in its entirety.

FIELD OF THE INVENTION

The invention relates to a method for the production of grounded panels and to a panel having a core made from a wood material board.

DISCUSSION OF BACKGROUND INFORMATION

Laminate panels have already been known for some time in the prior art and nowadays many different applications, particularly as a replacement for genuine wood panels, can no longer be imagined without them. An especially major field of use is the cladding of walls, ceilings and floors, where the respective cladding is assembled from corresponding wall, ceiling and floor panels. Of course, in various fields of use, the surface quality of laminate panels of this type has to satisfy various requirements. In this context, of course, a floor panel is exposed to substantially higher loads than, for example, wall or ceiling cladding.

The large-scale manufacture of laminate panels in this case involves a whole series of manufacturing steps which are largely identical for the various types of panel. First, a carrier board made, for example, from a wood material, such as MDF, HDF or OSB, is provided, and this is coated with a plurality of layers of, if appropriate, different materials. A decorative layer is supplied to an, if appropriate, pre-treated surface of a wood material board which has been provided as the core of the panel to be produced. This may take place, for example, in the form of a printed impregnated paper. The paper may also be printed directly onto the topside of the wood material board. This may take place by means of pressure rollers or a digital printer. Before the decoration is printed on, if appropriate, a grounding layer may also be applied to the surface of the wood material board. This decoration, particularly in so far as the panel is to be used as a floor panel, has to be covered by at least one wear layer. This may consist, for example, of a lacquer or of a synthetic resin. Advantageously, abrasion-resistant particles (for example, corundum) are admixed and make the surface of the finished panel more resistant to load caused by walking on it. The layer build-up with, if appropriate, a plurality of synthetic resin layers is finally pressed in a press under the influence of pressure and temperature, as disclosed in EP 1 454 763 B1 to which reference is made in full. Subsequently, the still large-format, now coated wood material board is divided into individual panels. After division into individual panels, connection means in the form of a tongue and groove with integrated locking means are attached to the side faces, so that two panels can be connected to one another by means of what is known as a "snap connection" and can be interlocked in the vertical and horizontal direction. In order to increase the realistic appearance of a laminate panel, it is known, during the pressing of the layer build-up, to emboss into the topside a structure matching with the decoration (embossed-in-register). The laminate panel is thereby further equated, for example, to a genuine wood panel not only visually, but also by feel.

Alternatively, coating may also take place with lacquer layers which are subsequently cured, using high-energy radiation, for example electron and UV radiation. In this case, too, the large-format coated carrier board is divided into panels only after the complete curing of the layers applied.

In the market of laminate panels, in particular of floor panels, a demand for ever more diverse decoration variants has been seen. Thus, there is a demand not only for ever new wood imitations, but also, increasingly, for tile and brick decorations and also fantasy decorations in the most diverse possible forms. However, the conversion of a large-scale manufacturing plant for laminate panels to a new decoration is relatively complicated and time-intensive and is therefore costly. Moreover, for example when the decoration is applied in the form of a printed decorative paper to the wood material core, decorative papers having diverse decorations have to be kept in stock. This requires a large amount of storage space and also ties up an unnecessarily large amount of capital due to the large quantity of decorative papers to be kept in reserve.

If the decoration is printed directly onto the wood material board, for example, via pressure rollers, a dedicated set of rollers has to be kept in reserve for each decoration, particularly the procurement of these rollers being cost-intensive. When a structure is to be embossed into the topside, the press platens or press plates additionally have to be engraved cost-intensively. Moreover, the exchange of such press platens or press plates takes up time during which the production plant is at a standstill, and therefore the production costs for laminate panels rise. For the abovementioned reasons, it is economically expedient to produce relatively large quantities of laminate panels with a decoration once selected before panels having another decoration are produced.

However, as well as the demand for ever more diverse decoration variants, a growing reduction in the order sizes demanded is also to be seen. If, however, quantities of laminate panels with a specific decoration which are too small are demanded, these cannot be produced economically. Individual orders therefore have to be "collected" by the trade or by wholesalers, thus resulting for the end user in long delivery times which are unacceptable particularly in the do-it-yourself sector. Some of the demand consequently cannot be satisfied.

WO 2010/055429 A2 discloses a method for the production of a panel, in which, first, a grounding is applied to the topside of a large-format wood material board. The wood material board thus grounded is, if appropriate, pressed and is subsequently divided into individual panels. Only thereafter are the individual panels printed with the desired decoration.

One disadvantage is that, although, by virtue of the method described in the publication mentioned, the manufacturing plant itself can be designed to be smaller and more compact since the large-format wood material boards no longer have to be printed, but, instead, smaller panels, it is usually not possible to achieve faster delivery times for small batch sizes with individual decorations. If a customer orders a small quantity of panels having a desired decoration, for example, from a panel dealer, the dealer will collect the incoming orders until he orders, overall, a sufficient number of panels from the panel manufacturer. This is necessary in order to keep the transport costs within justifiable limits, since laminate panels are transported, for example, by large heavy goods vehicles which, so that they can operate efficiently, have to be loaded up to a certain capacity. Although the efficiency of the production method can be increased, using smaller plants, by virtue of the method described in WO 2010/055429 A2, flexibility, particularly regarding the fast delivery of small and very small batch sizes with individual decorations, is not achieved.

SUMMARY OF THE INVENTION

The problem to be solved according to the invention is, therefore, that, with the current procedure for producing the laminate panels required by the end user, it is not possible for economic reasons to satisfy even unusual customer wishes in a justifiable delivery time, in so far as a minimum batch size is not required, and that, even if the minimum batch size were to be reached (for example, in the article sector, that is to say the equipment of large offices or hotels), a longer delivery time has to be taken into account, because, of course, the plant at the panel manufacturer's first has to be converted accordingly, this not being possible within a few hours or days even in the worst order situation.

This problem can be solved in that the chain of the production process is interrupted and the dealer who receives the end user's wish for a decoration can apply the decoration himself to the panels. However, the dealer cannot handle and divide up wood material boards having dimensions of several metres.

The object on which the invention is based is, therefore, to propose a method which affords the possibility that a dealer to whom raw panels are made available can subsequently provide these with a decoration according to the customer's wish, so that even very small order sizes can be produced flexibly and efficiently and at the same time the storage and material costs are reduced.

The invention achieves the set object by means of a method for the production of grounded panels as semi-finished products, with the steps:
  a) provision of a wood material board,
  b) application of a grounding in the form of a synthetic resin layer to at least one topside of the wood material board,
  c) application of a coating to an underside, lying opposite the topside of the wood material board, of the wood material board,
  d) pressing of the layer build-up consisting of the wood material board, grounding and coating under the influence of pressure and, if appropriate, temperature,
  e) division of the wood material board into individual panels,
  f) cutting machining of side faces of the panels for the incorporation of connection and locking means,
  g) transport-safe packaging of the grounded panels.

This method affords a semi-finished product which in itself is not yet marketable. However, the dealer can purchase semi-finished products according to his requirements and store these on his premises. The grounded raw panels have already been produced by the manufacturer such that they fulfil their function in technical terms. They are therefore suitable to be connected to one another by the connection and locking means and to be used as wall, ceiling or floor panels. However, since a wear layer is absent on the surface of the panels, the panels are exposed without the least possible protection to the stresses arising particularly in use as a floor panel. Moreover, they still have no decoration. The grounded raw panels produced by means of the method described differ from finished panels only in the lack of a decorative layer and the lack of at least one wear layer. The end user can pick out a decoration and a colour for the panels at the dealer's, and the dealer prints the individual ready-premade panels and seals the decoration. Customer wishes can thereby be attended to in an extremely flexible way, because the decoration can be combined in any desired way both in terms of the grain (wood decoration) and in terms of its colour. The manufacture of the semi-finished product can produce efficiently because only one type of panel is produced, this panel subsequently being delivered to the various dealers and stored there. The dealer can reduce his permanent stock of panels because he can of course fulfil each customer wish directly.

The grounding may be applied in the form of a resin-impregnated paper or be a synthetic resin applied directly to the topside. Alternatively, the grounding may also be glued in the form of a film, coated particularly with a synthetic resin, to the topside of the wood material board. In this case, an adhesive containing synthetic resin may also be used.

A structure is advantageously embossed into the grounding during the pressing of the layer build-up.

It proved to be especially advantageous if a quality check is carried out after cutting machining.

In order to increase the printability of the surface of the grounded panel to be produced, the grounding is advantageously coloured. In order to improve the adhesion of the colour later to be applied on the grounding, a primer may also be applied to the grounding.

Advantageously, the connection and locking means are milled out from the panel. The panels are preferably cleaned before transport-safe packaging.

A panel according to the invention has a core made from a wood material board, on the topside of which only a grounding in the form of a synthetic resin layer and, if appropriate, a primer are applied, which are pressed together with the core, a coating being applied on the underside of the latter, and the connection and locking devices matching one another being provided on mutually opposite side faces of the panel.

In this case, the roughness of a topside of the panel is advantageously lower than 20 µm, especially preferably lower than 10 µm. ISO 4287-1 is mainly used as a test standard for the surface roughness. In order to ensure that the panel has an especially good printability, for the colour of a topside of the panel in the CIELAB colour range a brightness parameter L is higher than 92, and a red-green value A lies between −5 and +5, preferably between −2 and +2, and a yellow-blue value B lies between −15 and +15, preferably between −8 and +8. The standard DIN 6174 serves as the standard basis for this colour range.

Advantageously, the topside of the panel has a structure. The connection and locking devices may be formed in one piece with the wood material board. Especially preferably, connection and locking means which match one another are provided on all the mutually opposite side faces.

The idea on which the invention is based is to make the production of laminate panels, particularly for use as wall, ceiling and floor coverings, more flexible, simpler and more cost-effective. For this purpose, there is provision, within the framework of large-scale manufacture, for producing only grounded panels as semi-finished products. These have a core made from wood material which may be designed, for example, as OSB, MDF or HDF. This is coated with a grounding which is pressed together with the core of the wood material board. This gives rise to an easily printable surface which has the required properties for ensuring an excellent printed image during subsequent printing. The grounding in the form of a synthetic resin layer may in this case be applied in the most diverse possible forms to the core made from wood material. It is conceivable, for example, for application to be in the form of a resin-impregnated paper, as a synthetic resin layer applied directly to the topside or in the form of a finish film which is pasted on, for example, by means of an adhesive which may contain synthetic resin. All these applied groundings lead to an especially high surface quality. Depending on the grounding applied to the wood material board, a coating is applied to the underside lying opposite the topside of the wood material board. This coating may, for example, assume the function of counteraction. This is necessary particularly when, during the drying of the applied grounding, a tensile force is exerted upon the wood material board parallel to the surface of the latter. By corresponding coating being applied to the underside of the wood material board, a corresponding force is also exerted upon the underside, so that arching or dishing of the wood material board is effectively prevented.

If the grounding is applied, for example, in the form of a coated film which is already finish-cured, the application of counteraction may be unnecessary. The coating applied to the underside can then, for example, prevent the uptake of moisture into the underside of the wood material board or merely have visual reasons. Thus, the acceptance of a panel on the market by the end consumer can thereby be increased, in particular, in that the wood material board functioning as a core can no longer be seen even on the panel underside which is no longer visible in the installed state.

After the grounding has been applied to the topside and the coating to the underside of the wood material board, the layer build-up is pressed together. This may take place under the influence of pressure and temperature. This is necessary especially when at least one of the applied layers is to be connected to the wood material core. If the grounding is pasted on in the form of an already finish-cured film, pressing under pressure is sufficient.

After the pressing of the layer build-up, the still large-format coated and pressed wood material board is divided into individual panels. Side faces of the panels are subsequently machined by cutting in order to incorporate connection and locking means. These connection and locking means may consist of simple tongue-and-groove profilings or comprise complicated profiles, which ensure that two connected panels are interlocked, for example, both in a vertical and in a horizontal direction. Moreover, connection and locking means may also be incorporated in side edges of panels, into which still separate connection elements which may consist, for example, of plastic are inserted. However, for installing or connecting two identical panels, it is advantageous if connection and locking means are worked, for example milled, out of the panel such that two identical panels can be connected to one another and interlocked without additional connection elements.

The grounded panels thus produced are finally packaged in a transport-safe manner. A quality check may be carried out beforehand in order to ensure that the grounded panels have as high a quality as possible.

Since the laminate manufacturer produces only grounded panels to which the decorative layer does not have to be applied, both the stockkeeping and the material costs for the laminate manufacturer are reduced. Decorative papers having various decorations do not have to be kept in stock or embossing rollers or embossing plates do not have to be provided so that panels having different decorations can be produced. As a result, both the required storage space and the tied-up capital are markedly reduced. Moreover, conversion times are avoided, since all the panels have the same grounding. The production plant can thereby operate more efficiently and the production costs are further reduced.

In order to ensure that the panels thus produced have especially good printability, the grounding is, in particular, coloured. In this case, in particular, a plurality of colours are possible, white or beige are mentioned as examples. In this case, for example, coloured papers are used as the print base, the colour of which corresponds to the lightest colour shade in the decoration to be printed on. If, as here, the decoration to be applied is not yet known, a white or at least very light grounding is therefore advantageous. However, every other colour may likewise be envisaged as a grounding. In order to achieve special effects during the subsequent printing of panels pre-grounded in this way, a structure may be introduced into the grounding. This takes place advantageously during the pressing of the layer build-up, in particular by embossing plates or embossing rollers used in this case.

However, pre-grounded panels produced in this way have, overall, a very smooth surface. In particular, the surface is homogeneous and, in so far as the grounding is coloured, affords good covering. This, in combination with very low fault frequency due to surface faults or dirt particles, is very important particularly for digital printing in which the pre-grounded panel is printed directly by means of a digital printer. A coloured wood material board may at least partially assume the function of a grounding.

Owing to the very low surface roughness of the topside of the panel, which, for example, is less than 20 μm, especially preferably even less than 10 μm, a very good printed image is achieved during subsequent printing. ISO 4287-1 is mainly used as a test standard for the surface roughness. If the wood material board or the grounding is coloured, advantageously, for the colour, a brightness parameter L is higher than 92, a red-green value A lies between −5 and +5, preferably between −2 and +2, and a yellow-blue value B lies between −15 and +15, preferably between −8 and +8. The specified values describe colours in the CIELAB colour range. DIN 6174 is the standard basis for this colour range. The colour of the grounding or of the coloured wood material board should in this case correspond to the lightest colour shade in the decoration to be applied. In so far as the latter is not yet known, as in the present case, it is of course appropriate to have an especially light, particularly white, surface colour.

Panels pre-grounded in this way are stored at the laminate manufacturer's in a central store, for example a high-bay warehouse. They may previously be cleaned and packaged, in particular, such that, in further processing, they can be directly printed or processed, without the panels having to be cleaned again there. However, this must be reserved for only a single type of panel, so that space-intensive storage of panels having different decorations, different surface structures or different surface qualities is no longer necessary.

The grounded panels are subsequently transported for further processing. This may, for example, involve a franchise operation associated with the laminate manufacturer, home-improvement market, an interior decorator, a dealer or a floor layer.

Here, the pre-grounded panels are unpacked from the transport-safe packaging. A decorative layer having a decoration according to the direct customer's wish is subsequently applied to the grounding or primer and covered by at least one wear layer.

The application of the decorative layer to the grounding or to the primer may take place in various ways.

The decorative layer may, in particular, be printed directly onto the grounding or primer. In this case, the pre-grounded panel passes through a printing unit which is advantageously a digital printer. It is thereby possible, in particular, to print different decorations onto different panels quickly and simply in succession, without the printing unit having to be converted to the new decoration. Since only individual panels have to be printed, not entire large-format wood material boards, as is customary in the prior art, the printing unit can be designed to be small and compact and therefore space-saving and cost-effective. Alternatively, a decorative paper, which can be kept in the form of large rollers, may also be printed with a decoration and subsequently be pasted as a decorative layer onto the grounding or primer.

In both the instances, the decorative layer should be covered by at least one wear layer. The number and type of wear layers applied depend in this case greatly on the planned place of use of the panels thus decorated. Particularly in the case of wall and ceiling panels, it is often sufficient when at least one wear layer covers the decorative layer in a wipe-resistant manner. If, however, the printed panels are used as a floor panel, they are exposed to markedly higher load. In this case, in particular, a plurality of wear layers may be applied, to which are admixed additives which increase the abrasion and/or scratch resistance of the topside of the then finished panels.

The at least one wear layer may in this case consist of a synthetic resin and, after being applied, may be cured under the influence of pressure and temperature. During pressing, a structure, which, in particular, matches the decoration of the decorative layer, may also be embossed into the at least one wear layer, in order thereby, for example, to make the natural appearance of a genuine wood decoration closer to reality.

Alternatively, the at least one wear layer may also be in the form of at least one lacquer layer which is then cured, using high-energy radiation, for example electron or UV radiation. In this case, a structure-forming lacquer may also be applied, via which, during curing, a structure can be introduced into the at least one wear layer.

In curing by high-energy radiation and by pressing, in particular, a walk-on surface of the panel can be ensured. This takes place especially when the panel is to be used as a floor panel.

In all the instances mentioned hitherto, in further processing, for example in the home-improvement market, the decorative layer must be covered with at least one layer consisting of a synthetic resin or lacquer and subsequently be cured. For this purpose, a relatively high outlay in terms of apparatus is required, which entails not only an increased amount of space, but also relatively high investment costs. Moreover, it may be necessary to employ specialized personnel in order to operate an apparatus for carrying out the method steps necessary during further processing, in particular during coating with synthetic resin or lacquer.

In an especially simple way, therefore, the decorative layer and the at least one wear layer can be applied to the pre-grounded panel by means of the following method steps. The at least one wear layer is provided on a carrier medium, for example a film. Should a plurality of wear layers be necessary, these are located in reverse order on the carrier medium. The wear layer which is to form the topside in the finished panel is consequently located directly on the carrier medium and is covered by the wear layers which lie under it in the finished panel. During further processing, various layer build-ups of the said at least one wear layer on the carrier medium are kept in stock. The wear layer which is to cover the decorative layer in the finished panel is therefore located at the very top on the carrier medium in the layer build-up. This wear layer is then printed with the decoration to be applied to the panel. The entire layer build-up is subsequently laid onto the grounding or primer such that the decoration then lies directly on the grounding or primer and is covered by the at least one wear layer. The carrier medium, for example the carrier film, is then located at the very top in the layer build-up. This layer build-up is then pressed together with the pre-grounded panel. For this purpose, it is sufficient if pressure is exerted upon the layer build-up. Since the at least one wear layer which is located on the carrier medium is already finish-cured, action under the influence of increased temperature is unnecessary.

Subsequently, the carrier medium is pulled off, and the decorative layer and the at least one wear layer remain on the grounding or primer. It is thus possible to finish-refine the grounded panel, without supplying liquid resins and lacquers which still have to be cured. Both the outlay in terms of apparatus and the investment volume and thereby markedly reduced. In this embodiment, a structure, which matches, in particular, with the decoration of the decorative layer, may also be embossed into the at least one wear layer during the pressing of the layer build-up.

An apparatus for refining a panel according to a method just described comprises in this case, in particular, a printing unit for printing the decoration onto the grounding or primer, the decorative paper or the carrier medium coated with the at least one wear layer, basically in any desired colour and grain, and, moreover, an input device, by means of which a selection of a decoration can be input, which is filed in a data store in the form of electronic data. The apparatus comprises, moreover, an electrical control which is set up for reading the selected decoration out of the data store and for activating the printing unit such that the selected decoration is printed. Also, especially conveniently for the customer, this apparatus comprises an indicator device, via which the available decorations are indicated to the user.

In concrete terms, a method of this type may, for example, in a home-improvement market, proceed as follows.

A customer who requires panels for a specific room size first obtains information as to the number of panels which he needs. He can look at various decorations available for selection on an indicator device of an apparatus by means of which the grounded panel can be refined, as described above. These decorations are filed in the form of electronic data in a data store inside the apparatus. Alternatively, the apparatus could, for example, also have a drive, for example for a CD, DVD or the like. The customer can then also himself bring along a corresponding data carrier on which decorations are stored in a predetermined data format. It is thus possible that the customer receives his completely individual decoration printed on panels.

After the customer has selected a decoration, he inputs this selection via the input device. The customer can also select how many panels are to be printed with the selected decoration and for which purpose he wishes to use these panels. Different wear layers are applied to the panel, depending on the intended use which has been input.

Inside the apparatus, then, the desired decoration is applied to a pre-grounded profiled panel and is covered with the combination of wear layers which is considered necessary. After these are cured, if necessary, the customer can receive the panels printed with his individual decoration and can use them.

Should he notice in this case that he has not had sufficient panels printed or that it would be necessary, for example, to exchange individual panels which have become worn in the course of time, it is possible at any time for him to reorder individual panels on an apparatus described.

As a result, flexibility in the production of laminate panels is markedly increased, and even the smallest application quantities having the most diverse possible decorations can expediently be produced efficiently.

BRIEF DESCRIPTION OF THE DRAWINGS

The method described is explained in more detail below with the aid of the following illustrative drawings in which.

DETAILED DESCRIPTION OF THE PRESENT INVENTION

Figure 1:
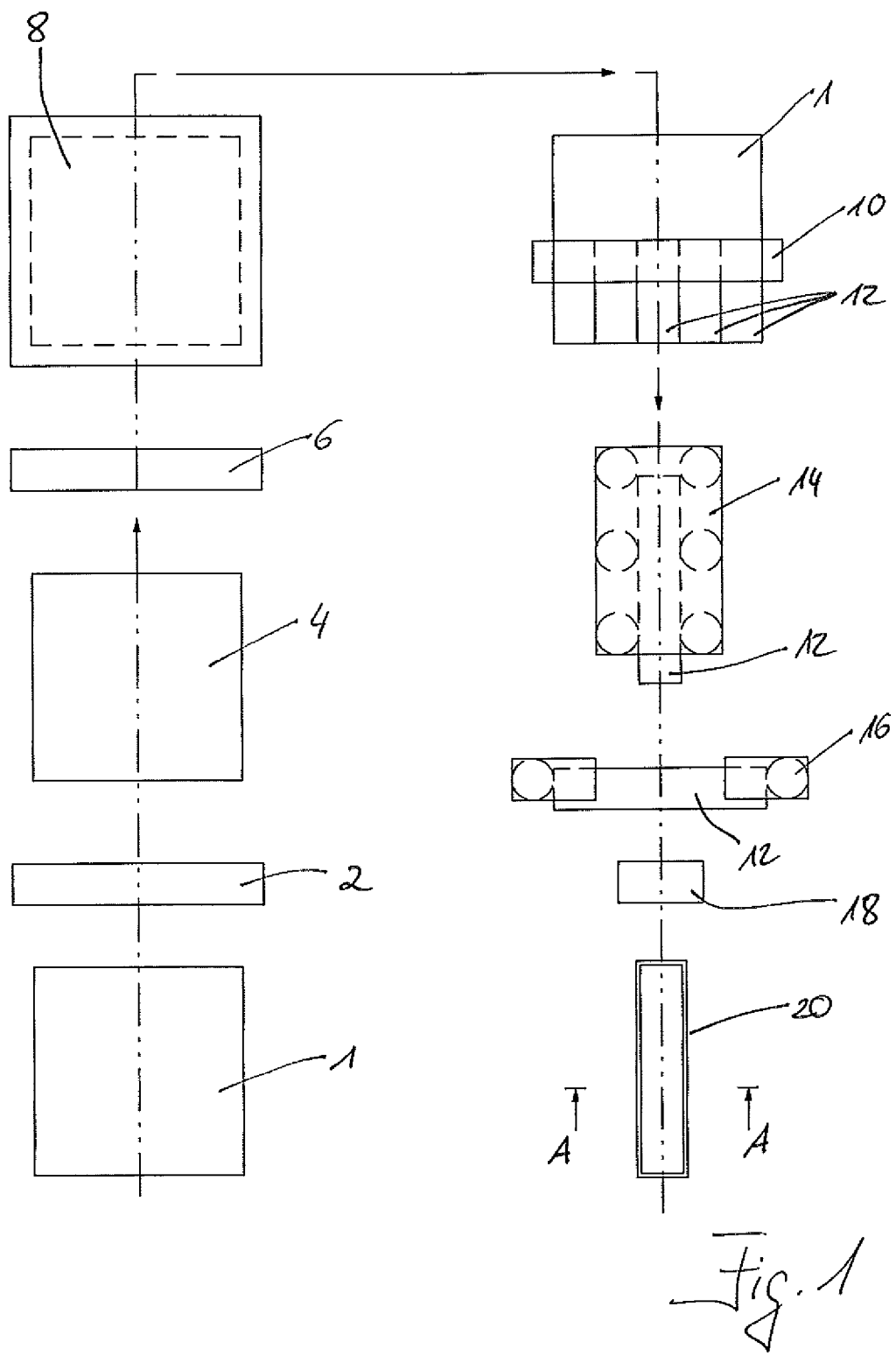
FIG. 1 shows a diagrammatic illustration of an exemplary embodiment of the method for the production of grounded panels.

FIG. 1 shows the diagrammatic illustration of a method for the production of a grounded panel as a semi-finished product, such as can be carried out at the laminate manufacturer's. The processing direction is identified by arrows. The production method commences at the bottom left in FIG. 1.

The method commences with a large-format wood material board 1. The wood material board 1 is first fed to a pre-treatment device 2 in which the large-format wood material board 1 is prepared for carrying out the method. Inside this pre-treatment device 2, for example, a topside of the wood material board 1 can be ground, or other smoothing of the surface can take place. The wood material board 1 is prepared such that a material layer can be applied to the topside. For this purpose, the wood material board 1 is, for example, additionally cleaned and/or heated in the pre-treatment device 2. Moreover, quality assurance can take place in order to ensure that the surface of the wood material board 1 is suitable for carrying out the method.

After the wood material board 1 has been prepared in the pre-treatment device 2, it is fed to a grounding device 4. In the grounding device 4, a grounding in the form of a synthetic resin layer is applied to the topside of the wood material board 1. This may take place, for example, by the application of a liquid synthetic resin layer or in the form of a resin-impregnated paper. Alternatively, for example, a film, which is coated, in particular, with a synthetic resin, may also be glued to the topside of the wood material board 1. An adhesive containing synthetic resin may also be used for this purpose.

After the wood material board 1 has passed through the grounding device 4, it is fed to a drying device 6 in the exemplary embodiment shown in FIG. 1. Here, where appropriate, the grounding applied to the topside of the wood material board 1 in the grounding device 4 and taking the form of a synthetic resin layer is dried.

The coated wood material board 1 subsequently passes, in the method shown in FIG. 1, through a short-stroke press 8 in which the wood material board 1 is pressed under the influence of pressure and temperature together with the grounding applied in the grounding device 4 in form of a synthetic resin layer. Other forms of a press, for example a belt press, may, of course, also be envisaged. Particularly when the grounding in the form of a synthetic resin layer is applied, already finish-cured, for example by means of a film, in the grounding device 4, if appropriate pressing only under the influence of pressure, without an increased temperature, is also sufficient.

The grounded wood material boards 1 pressed in the short-stroke press 8 subsequently pass through a cutting-to-size device 10 in which the large-format wood material board 1 is divided into smaller panels 12. Profiles are subsequently incorporated at the side edges of the panels 12 and make it possible to connect two identical panels 12 to one another. In this case, first, longitudinal profiles are milled out of the side faces of the panels 12 in a first milling device 14. It is consequently possible to connect two identical panels 12 to one another along their longer side faces.

The panels 12 subsequently pass through a second milling device 16 in which the short side faces are also provided with a profile, in this case a transverse profile. Identical panels 12 can therefore also be connected to one another along their short side edges.

The grounded panels provided with connection means subsequently pass through quality assurance 18 before they are packaged, in a transport-safe manner, in a packaging station 20.

During the pressing of the wood material board, coated with the grounding, in a short-stroke press 8 or in another press apparatus, in particular, a structure may be embossed into the grounding. Additionally or alternatively to this, a relief may also be provided in the large-format wood material board 1. So that a relief can be embossed into the wood material board 1, in particular, the wood material board 1 may be sprayed with water before the grounding is applied in the grounding device 4. An exemplary method was described in DE 10 2008 008 240.

Figure 2:
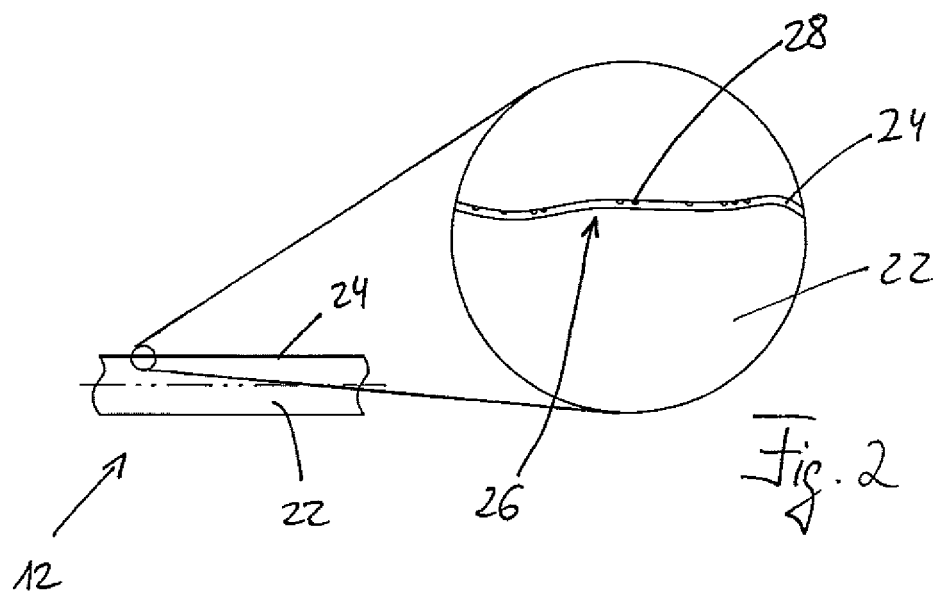
FIG. 2 shows a cross section through a panel produced by the method according to FIG. 1, with an enlarged detail from it.

FIG. 2 shows a section along the line A-A from FIG. 1 through a pre-grounded panel 12, and also in enlarged detail from this. The panel 12 comprises a core 22 onto which a grounding 24 has been applied. The topside of the core 22 shows a relief 26 in the form of an uneven surface of the core 22. A structure 28, which has markedly finer elements than the relief 26 embossed into the core 22, is embossed into the grounding 24.

Figure 3:
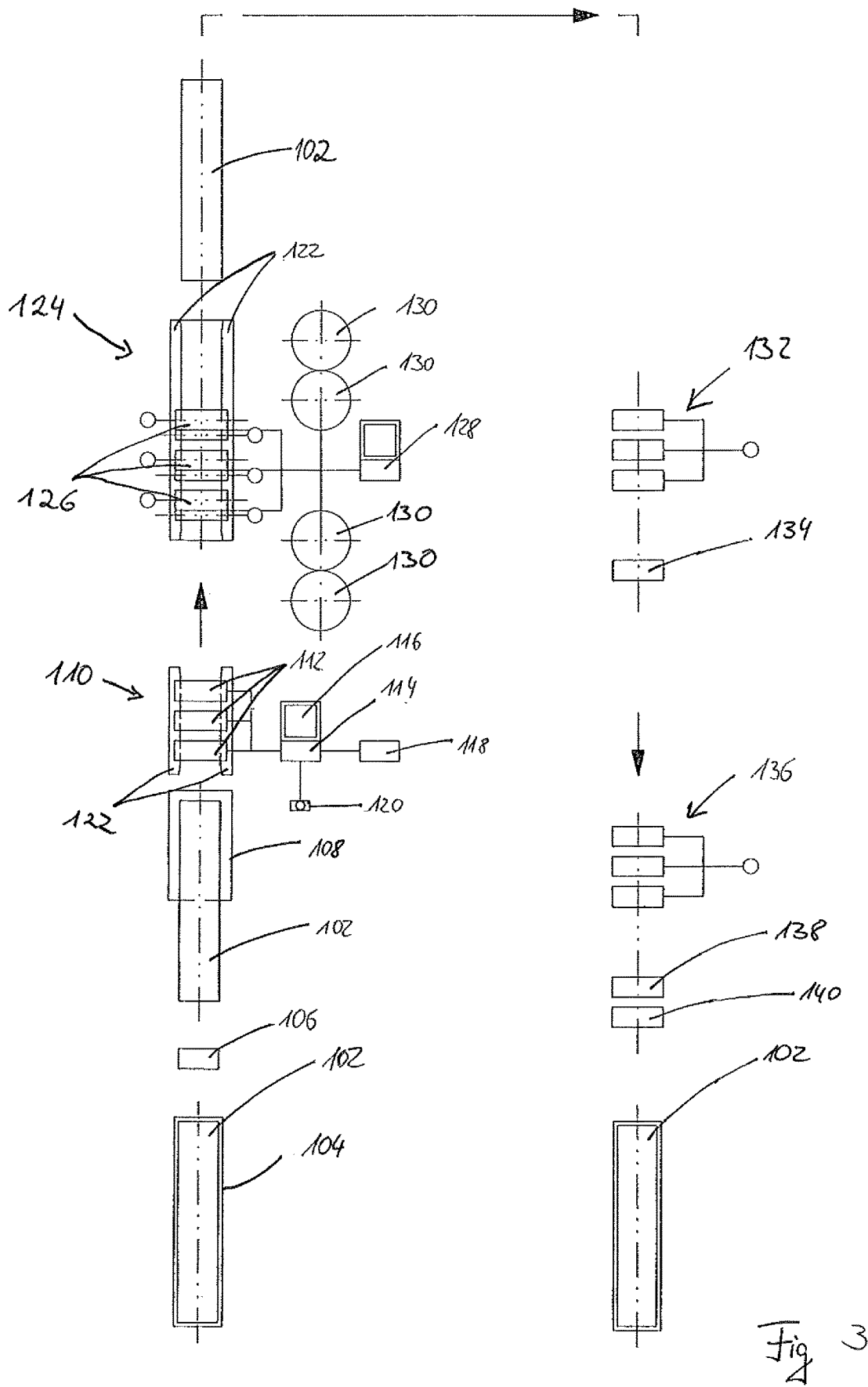
FIG. 3 shows a diagrammatic illustration of an exemplary embodiment of the method for the refinement of a panel, such as is carried out during further processing.

FIG. 3 shows the diagrammatic illustration of a method for the refinement of a panel, such as may be carried out during further processing, for example by a franchisee associated with the laminate manufacturer, in a home-improvement market or the like. The processing direction is identified by arrows. The processing method commences at the bottom left in FIG. 3.

The finish-grounded panels 102, coming from the laminate manufacturer in transport-safe packaging 104, are delivered for further processing. In a first method step, the panels 102 are removed from this transport-safe packaging 104. In the exemplary embodiment of the method, as shown in FIG. 3, the panels 102 are subsequently fed to a cleaning apparatus 106 in which the surface of the panels 102 is cleaned of dirt residues and dust which may possibly be adhering and is thus prepared for the application of the decorative layer. It is also conceivable, however, that the panels 102 have been cleaned suitably for later printing at the laminate manufacturer's. These can then have been introduced, cleaned, into the transport-safe packaging 104. By virtue of transport pack 104 being sealed, air-tight, in a film, for example, the situation can be ruled out where the panels 102 subsequently have to be cleaned again before they are printed.

After the panels 102 have, where appropriate, passed through the cleaning apparatus 106, they are aligned in an acceleration section 108 and spaced apart at the desired distance from one another. The panels 102 are subsequently fed to a printing unit 110. Here, the surface of the panel 102 is printed with the decorative layer to be applied. For this purpose, in the exemplary embodiment shown in FIG. 3, the printing unit 110 has three printing heads 112. Depending on the desired decoration, the printing unit 110 may also have more or fewer printing heads 112. Connected to the printing unit 110 is an electronic data processing device 114. This has an input device, not shown in FIG. 3, via which the user of an apparatus for carrying out the method can select the desired decoration.

For this purpose, the electronic data processing device 114 has an indicator device 116, via which the available decorations filed, for example, on an electronic storage medium are indicated to the user. The user can select from this selection the decoration which he would like to have printed onto his panels.

In the exemplary embodiment shown in FIG. 3, the electronic data processing device 114 additionally has a scanner 118. If, then, a user of the apparatus for the refinement of the panel 102 brings with him an individual decoration, for example in the form of a paper print-out, the pattern can be read via the scanner 118 into the electronic data processing device 114 and can be applied to the topside of the panel via the printing heads 112 of the printing unit 110. The user is therefore no longer restricted to the pattern selection filed in the electronic data processing device 114.

Moreover, in the exemplary embodiment shown in FIG. 3, the electronic data processing device 114 has a camera 120. Via this camera 120, it is possible, for example, to photograph decorations of surfaces which, for example, the customer has brought along, but which cannot be scanned, and thereby to read these decorations into the electronic data processing device. Even decorations of this type can be applied to the topside of the panel 102 via the printing heads 112 of the printing unit 110. For example, a CD-ROM drive may also be provided, via which the customer can cause a decoration stored in a defined format on a CD-ROM to be read into the data processing device 114.

So that the panels 102 remain exactly in alignment when the decoration is being applied by the printing heads 112, the said panels are guided in the printing unit 110 by guide elements 122.

In order to ensure as optimal a result as possible, the decoration proposals filed in the data store of the electronic data processing device 114 are optimized to the possible formats of the panels 102 to be printed. Individual decorations of a user of the apparatus described, which have been read into the electronic data processing device 114, for example, via the scanner 118, the drive or the camera 120, can be adapted to the panel formats. The decoration selection filed in the data store of the electronic data processing device 114 can in this case, in particular, be updated online.

After the topside of the panels 102 has been printed with a decoration, the panels 102 leave the printing unit 110 and are fed to a coating apparatus 124. In the exemplary embodiment illustrated in FIG. 3, this comprises three applicator devices 126, via which a wear layer can in each case be applied to the topside of the panel. The applicator devices 126 are controlled by a second electronic data processing device 128. This has a merge program by which the composition of the individual wear layers is controlled. The second electronic data processing device 128 can in this case activate various reservoirs 130 and mix their contents to form the wear layer desired in each case. One of these reservoirs 130 contains the basic substance of each individual wear layer which, for example, may be a synthetic resin or else a lacquer. The further reservoirs 130 contain, for example, hardeners, corundum for increasing the abrasion resistance of the finish-coated panel and further additives which are selected according to the intended use of the then finished panel.

As in the printing unit 110, different panel formats can also be processed in the coating apparatus 124. The panels 102 to be coated are also guided via guide elements 122 inside the coating apparatus 124. A possible layer build-up consists of a plurality of layers of radiation-hardenable lacquer. In this case, for example, two layers of an anti-abrasive UV basic lacquer are applied by means of a roller system in an application quantity of, for example, 35 $g/m^2$ to the topside, to be coated, of the panel 102. Each applicator device 126 is in this case designed in the form of a roller system. After the two layers of the anti-abrasive basic lacquer are applied, two further layers of a UV yellow earth size may likewise be applied in each case by means of an applicator device 126 designed as a roller system. The application quantity here amounts, for example, to 15 $g/m^2$ per yellow earth size layer. Finally, via a further applicator device 126, a layer of a UV covering lacquer is applied in an application quantity of, for example, 35 $g/m^2$. If appropriate, before each lacquer layer is applied, the lacquer layer previously applied is cured by means of UV or electron beams. In the exemplary embodiment shown in FIG. 3, the various wear layers, which, in particular, may also consist of a synthetic resin, are applied directly in succession, without the wear layer previously applied by an applicator device 126 being dried.

An applicator device 126 in the form of rollers may in this case be operated both in synchronism and in opposition. So that as many panels 102 as possible can be coated in a predetermined time, high speeds of advance of applicator devices 126 of this type are preferred. In particular, speeds of advance of between 10 m/min and 30 m/min are suitable here.

If lacquer layers are applied as wear layers in the coating apparatus 124 by the applicator devices 126, these applicator devices 126 may also be designed in the form of a splash or spray-lacquering device, a digital printing head, a casting head or a vacuum apparatus. Each layer applied may contain abrasion-resistant particles, for example corundum, or other additives. These depend on the subsequent use of the then finished panel.

After the panels 102 have left the coating apparatus 124, they are led to a first curing device 132. In the exemplary embodiment shown in FIG. 3, the wear layers which are applied in the coating apparatus 124 and may be present, for example, in the form of a lacquer are simply gelled merely by high-energy beams, for example electron or UV beams. Subsequently, in an embossing device 134, a structure is embossed into the topside of the coated panel, that is to say the wear layers. This structure, in particular, matches with the selected decoration of the decorative layer applied in the printing unit 110.

The embossing of the structure may in this case take place, for example, by means of a structured roller, a structured belt or a structure donor paper or structure donor film.

Alternatively, an overlay paper sheet may also be laid in place and subsequently pressed in a short-stroke press under the action of pressure and heat. In this case, in particular, structures are provided in the press plates and, during pressing, are embossed into the topside of the panel 102.

Particularly when lacquers are used as wear layers, a structure-forming quantity of lacquer may also be applied by means of a, for example, digitally activated printing head. Alternatively, a means which disturbs the flow of the lacquer may also be envisaged. This means, too, may be applied, using a digitally activated printing head. By a printing head of this type being used, it is possible to apply the means or the lacquer only at specific locations on the surface of the panel 102 and thus generate structure-forming depressions and elevations. If the structure embossed into the topside is to match with the decoration of the decorative layer, the panel 102 must be aligned before it passes through the embossing device 134. In the exemplary embodiment illustrated in FIG. 3, after passing through the embossing device 134, the panel 102 passes through a second curing device 136. Here, the, if appropriate, gelled wear layers are cured completely, so that a surface suitable for the in each case chosen use of the panel 102 is obtained.

Subsequently, the panels 102 pass through quality assurance 138, if appropriate labelling 140 or the like, if appropriate additionally also a cleaning device, and are finally packaged and can be taken away by the customer.

Especially advantageously, the electronic data processing device 114 is coupled to the second electronic data processing device 128. Then, during further processing, a customer is given various selection possibilities, for example, by means of a program. He can in this case, for example, choose whether the panel 102 is to be used privately or commercially, in a dry or a damp area, with references to various commercial classes of use being given. Moreover, the customer can decide whether the panel 102 to be coated will later be a floor, wall or ceiling panel. This information is important for the wear layers to be applied in the coating apparatus 124. In an apparatus for the refinement of a panel, the wear layers necessary for achieving a specific wear class, for example AC3 according to DIN EN 13329, are then applied automatically together with the required aggregates and additives. Lacquering and hardening in this case take place automatically.

Moreover, the customer can select the format of the panel and the thickness of the carrier board and also the desired decoration and, where appropriate, a structure to be embossed. By means of these customer stipulations, both the printing unit 110 and the coating apparatus 124 can be set to the thickness and format of the panels 102 to be coated.

Further selection possibilities for the customer are, for example, the selection of specific packaging. Thus, the panels may be introduced simply into a cardboard carton or may be packaged so as also to be protected against splashes of water by means of a film, for example a shrink film. Moreover, the customer can, for example, decide whether he would like to take the finished panels away immediately or fetch them himself at a later time or whether they are to be delivered by an outside firm.

An installation option by a specialized firm may also be envisaged. Moreover, the customer can, where appropriate, select warrantee and guarantee options for an extra price and, if appropriate, decide whether he buys or rents the panels.

The lacquering and curing of the lacquer layers may take place automatically inside a plant for the refinement of a panel according to the method described. Since the lacquers or resin layers used, which are applied as wear layers, can be optimized for this application, particularly in terms of their viscosity, a smooth application, without extra or fewer applications of lacquer at the start and end of the panels 102 to be coated, can be ensured. In order to protect the connection and locking elements already integrally formed on the panels 102, masks may be used which prevent the soiling or contamination of these connection and locking elements. Particularly during the curing of applied lacquer layers, the adhesion of the individual layers to one another and final curing can be implemented and ensured by setting the beam intensity. For multiple applications, the corresponding plant part, that is to say the coating apparatus 124 and the first curing device 132 and second curing device 136, can be passed through several times.

For the optimum utilization of a plant of this type, a plurality of applications may be produced directly in succession. After an application is concluded, fully automatic cleaning, in particular, of the applicator devices 126 may take place, so that a clean plant can be provided for the next application.

The method described has a series of advantages. After the finishing of the surface, the customer can take the finished product away immediately in the desired quantity and quality. Consequently, in particular, the problem of small quantities is solved for the laminate panel manufacturer, since he simply has to produce one type of panel, to be precise pre-grounded and structured panels, where appropriate, in different dimensions. Since the connection and locking means are milled onto pre-grounded panels or incorporated in another form in this method, the milling waste which occurs is reduced, in particular, in that no decorative paper or overlay paper is applied to the pre-grounded panels. The production costs are thereby markedly reduced. Moreover, by virtue of the method described, transport damage or transfer faults in orders are markedly reduced, since the customer can stand directly in front of the apparatus and input his wishes. It is no longer necessary for an order to be transferred to a laminate manufacturer.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A panel comprising a core made of wooden material with an upper side, to which only a coloured grounding in the form of a synthetic resin layer with an underside comprising an applied coating which exerts a tensile force upon the wood material parallel to a surface of the underside, which are pressed together with the core, and connecting and locking devices corresponding to one another provided on at least two opposite side surfaces, and a printed image printed on the coloured grounding on the upper side, wherein for the printed image a colour of the upper side of the panel in the CIELAB colour space, a lightness parameter L is greater than 92 and a red-green value A lies between −2 and +2 and a yellow-blue value B lies between −8 and +8, and further comprising an embossed structure of depressions and elevations in the upper side of the panel.

2. The panel according to claim 1, wherein a roughness of the upper side of the panel is less than 20 µm.

3. The panel according to claim 1, wherein a roughness of the upper side of the panel is less than 10 µm.

4. The panel according to claim 1, wherein the connecting and locking devices are formed in one piece with the core made of wooden material.

5. The panel according to claim 1, wherein the connecting and locking devices corresponding to one another are provided on all the opposite side surfaces.

6. The panel according to claim 1, further comprising a primer applied to the coloured grounding on the upper side and the printed image is directly on the primer.

7. The panel according to claim 1, wherein the wooden material is HDF, MDF or OSB.

8. The panel according to claim 7, wherein the coloured grounding is a resin-impregnated paper applied directly to the upper side.

9. The panel according to claim 8, wherein the paper is adhered directly to the upper side.

10. The panel according to claim 7, wherein the coloured grounding is white or beige.

11. The panel according to claim 7, wherein the coloured grounding is a colour which corresponds to a lightest colour shade in the colour of the printed image.

12. The panel according to claim 7, wherein the wooden material is a coloured wood material board.

13. The panel according to claim 7, further comprising at least one wear layer comprising hardeners and corundum applied to the upper side, which is synthetic resin or lacquer.

14. The panel according to claim 13, wherein the lacquer is a plurality of layers of radiation-hardenable lacquer.

15. The panel according to claim 14, wherein the plurality of layers of radiation-hardenable lacquer is at least two layers of an anti-abrasive UV basic lacquer.

16. The panel according to claim 15, further comprising an anti-abrasive UV yellow earth size lacquer applied to a top of the radiation-hardenable lacquer.

17. The panel according to claim 16, further comprising a layer of a UV covering lacquer applied to a top surface of the anti-abrasive UV yellow earth size lacquer.

* * * * *